(12) United States Patent
Harshman et al.

(10) Patent No.: US 6,533,337 B1
(45) Date of Patent: Mar. 18, 2003

(54) TRUCK BED EXTENSION WITH RAMPS

(76) Inventors: Mike Harshman, P.O. Box 292, Midwest, WY (US) 82643; Brian Harshman, P.O. Box 292, Midwest, WY (US) 82643

( * ) Notice: Subject to any disclaimer, the term of this patent is extended or adjusted under 35 U.S.C. 154(b) by 0 days.

(21) Appl. No.: 09/866,339

(22) Filed: May 25, 2001

Related U.S. Application Data (60) Provisional application No. 60/207,710, filed on May 26, 2000.

(51) Int. Cl.[7] .......................... B60P 3/073; B62D 33/02
(52) U.S. Cl. .............................. 296/26.08; 296/26.11; 296/61; 224/403; 224/405; 414/537
(58) Field of Search ................ 296/26.08, 26.09, 296/26.1, 26.11, 57.1, 61, 62; 224/402, 403, 405, 488, 495, 502, 506, 519; 414/537, 522

(56) References Cited

U.S. PATENT DOCUMENTS

| | | | |
|---|---|---|---|
| 4,020,957 A | | 5/1977 | Wren .......................... 214/38 |
| 4,874,284 A | | 10/1989 | New, Jr. ..................... 414/537 |
| 4,990,049 A | | 2/1991 | Hargrove .................... 414/537 |
| 5,029,740 A | | 7/1991 | Cox ......................... 224/42.01 |
| 5,033,662 A | * | 7/1991 | Godin ........................ 224/506 |
| 5,156,432 A | | 10/1992 | McCleary .................... 296/61 |
| 5,273,335 A | | 12/1993 | Belnap et al. ................ 296/61 |
| 5,425,564 A | | 6/1995 | Thayer ........................ 296/61 |
| 5,451,088 A | | 9/1995 | Broad .......................... 296/26 |
| 5,458,389 A | | 10/1995 | Young .......................... 296/26 |
| 5,494,393 A | | 2/1996 | Schrunk ...................... 414/537 |
| 5,518,288 A | | 5/1996 | Deklotz ....................... 296/100 |
| 5,533,771 A | | 7/1996 | Taylor et al. ................. 296/26 |
| 5,536,058 A | * | 7/1996 | Otis ............................ 296/61 |
| D376,564 S | * | 12/1996 | Mishoe ....................... D12/101 |
| 5,649,732 A | | 7/1997 | Jordan et al. ................. 296/26 |
| 5,678,743 A | | 10/1997 | Johnson et al. ............. 224/485 |
| 5,752,800 A | | 5/1998 | Brincks et al. ............. 414/537 |
| 5,816,638 A | | 10/1998 | Poot, III ................... 296/26.11 |
| 5,950,617 A | * | 9/1999 | Lorenz ......................... 108/44 |
| 6,076,215 A | * | 6/2000 | Blankenship et al. ........ 14/69.5 |
| 6,296,290 B1 | * | 10/2001 | Wolf ........................... 224/521 |

FOREIGN PATENT DOCUMENTS

CA          1222002 A  *  5/1987  ............... 296/26.08

* cited by examiner

*Primary Examiner*—D. Glenn Dayoan
*Assistant Examiner*—Patricia L. Engle
(74) *Attorney, Agent, or Firm*—Dorsey & Whitney LLP (57) ABSTRACT

A truck bed extender with one or more extendable ramps. The bed extender includes an extending rail having a truck end and a free end. The truck end is coupled to a trailer hitch receiver and the free end includes a bottom trailer hitch receiver. A support assembly is coupled to the extending rail receiver proximate the free end. The support assembly includes a rear T-shaped support member. The ramps are pivotally and slideably coupled to the support assembly proximate the rear T-shaped member. A locking bar is configured to secure the ramps at an angle between and including substantially horizontal and substantially vertical with respect the truck bed, and engages the support assembly.

2 Claims, 11 Drawing Sheets

TRUCK BED EXTENSION WITH RAMPS

CROSS-REFERENCE TO RELATED APPLICATIONS

This application claims the benefit of U.S. Provisional Application No. 60/207,710, filed May 26, 2000, entitled Truck Bed Extension With Ramps, the contents of which are hereby incorporated by reference as though fully set forth herein.

FIELD OF THE INVENTION

The present invention relates, in general, to an apparatus for hauling cargo. More particularly, the present invention relates to a truck bed extension with extendable ramps that can be retracted and pivotally locked at different angles.

BACKGROUND OF THE INVENTION

Modern pickup trucks generally include a truck bed which is approximately six to eight feet long. Although such truck bed lengths are often well suited for many hauling tasks, truck owners may sometimes be required to transport loads which, for one reason or another, do not fill the truck bed. For example, a pickup truck may be required to transport two all terrain vehicles (ATVs) at the same time. Unfortunately, ATVs are typically too wide to fit side-by-side within a truck bed and too long to be loaded one behind the other.

One solution for transporting two ATVs with a single pickup truck is to use a trailer to carry one or more of the ATVs. A trailer is commonly hitched to the back end of the truck and is pulled along by the truck. Thus, if a trailer is used, the first ATV can be loaded in the truck bed and the second ATV may be transported on the trailer bed.

A disadvantage of using a trailer to transport the second ATV is that the mobility of the truck and trailer combination is often limited. In general, a truck pulling a trailer cannot travel on rougher roads without risking damage to the trailer and truck. Also, a truck pulling a trailer must typically drive at a slower speed to maintain control of the vehicle. Moreover, conventional trailers generally take up a large amount of room, making them inconvenient to park or store.

Another way of carrying loads longer than a pickup truck's cargo bed is to install a bed extender to the pickup truck. Bed extenders are typically mounted to a hitch receiver at the back end of a truck. They generally include a cantilevered extension rail attached to a load-bearing beam which supports loads protruding beyond the truck bed. The load-bearing beam is positioned at a distance behind the truck bed and is aligned with the height of the truck bed. The load-bearing beam thus prevents longer cargo from falling or tipping off the truck bed by providing additional load support behind the truck.

In general, however, conventional bed extenders are not well suited for transporting small vehicles such as ATVs because of the gap which exists between the load-bearing beam and the tailgate. The ATV's tires can fall into the gap, thereby wedging the ATV between the load-bearing beam and the tailgate. To alleviate this problem, truck owners often place a bridging platform between the truck bed and the load-bearing beam to support ATV tires as they roll between the load-bearing beam and the tailgate. In addition, a separate ramp assembly is typically required to load and unload vehicles on and off the bed extender.

At times, however, unstable or weak materials, such as thin plywood boards, are used as temporary bridging platforms and ramp assemblies to roll vehicles on and off trucks equipped with a bed extender. Such a solution can be dangerous since the boards may break or slide, causing the ATV to fall from the bed extender. The falling ATV may result in property damage and potentially injure people in close proximity. What is therefore needed is a bed extender with a safe and stable bridging platform and ramp assembly to load and unload small vehicles on and off pickup truck beds.

Another drawback of using conventional bed extenders which require separate bridging platforms and ramp assemblies is that the truck owner must typically transport the bridging and ramp assemblies along with loaded ATVs. In general, cargo space is limited in truck beds and finding room for these loading structures can be very difficult. What is therefore also needed is a bed extender which incorporates a bridging platform and ramp assembly in a space saving manner.

Yet another drawback of using conventional bed extenders to transport cargo is that a trailer cannot typically be pulled by a truck once the bed extender is attached to the truck. For instance, a vacationer desiring to transport two ATVs and a boat trailer with a single pickup truck cannot do so when a bed extender is used to carry the two ATVs. As mentioned earlier, bed extenders are generally mounted to a hitch receiver at the back end of the truck. Since the bed extender occupies the truck's hitch receiver, a trailer cannot typically be attached to the truck. Thus, conventional bed extenders generally do not allow for hitching trailers to pickup trucks. What is therefore needed is a bed extender capable of coupling to a trailer.

SUMMARY OF THE INVENTION

Briefly stated, the present invention is a bed extender for a pickup truck having a truck bed and a trailer hitch receiver. The bed extender includes an extending rail with a truck end and a free end. The extending rail is coupled to the trailer hitch receiver proximate the truck end. A support assembly is coupled to the extending rail proximate the free end of the extending rail. The support assembly also includes a rear T-shaped support member. One or more extendable or collapsible ramps are pivotally and slideably coupled to the support assembly proximate said rear T-shaped member. A locking bar engages the rear T-shaped support member and is configured to secure the extendable ramps at an angle between and including substantially horizontal and substantially vertical with respect to the truck bed.

The present invention further involves a method of loading a vehicle having wheels onto a pickup truck. The method includes moving the vehicle along a ramp onto the pickup truck. The ramp has a bottom ramp section pivotally connected to a top ramp section, and the method next comprises resting the vehicle at a position where at least one of the wheels of the vehicle is proximate a rear T-shaped member. The T-shaped member is cantilevered to the pickup truck, and the method next requires folding the ramp such that said bottom ramp section is tucked under said top ramp section. The ramp is then pivoted at the rear T-shaped member to an angle and locking at the angle.

DETAILED DESCRIPTION OF PREFERRED EMBODIMENT

The present invention is described in detail below with reference to the figures described above. Like structures and elements shown throughout the figures are indicated with like reference numerals. The particular applications shown in the figures and described herein are presented as examples only, and are not intended to limit the scope of the present invention.

Figure 1:
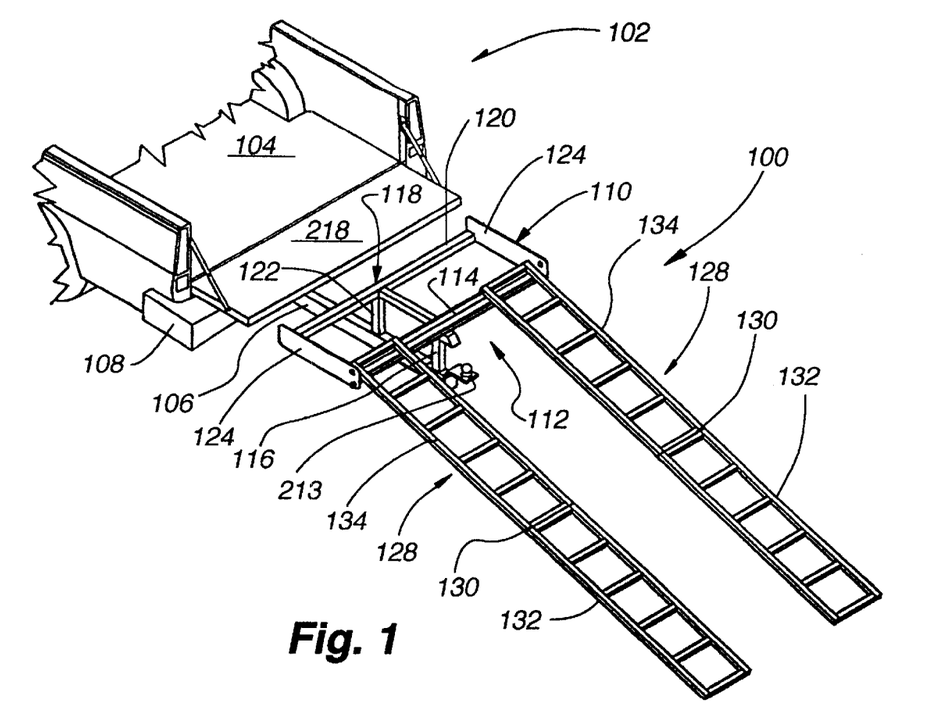
FIG. 1 shows a rear perspective view of a bed extender attached to a pickup truck, in accordance with one embodiment of the present invention.

FIG. 1 shows a perspective view of a bed extender 100 according to the present invention. The bed extender 100 is composed of a sturdy material, such as but not limited to steel, aluminum, or a combination thereof. As discussed in detail below, the bed extender 100 has several beneficial uses, such as, but not limited to, allowing a user to load two ATVs onto a pickup truck 102 in a safe and convenient manner. In addition, the bed extender 100 provides extra support for lengthy cargo which would otherwise be too long to fit in a truck bed 104. The bed extender 100 can also receive a trailer hitch and be used to pull a trailer.

As shown in FIG. 1, the bed extender 100 includes a cantilevered extending rail 106 coupled to the pickup truck 102. The extending rail 106 projects from a centrally located frame position below a truck bumper 108 in a direction substantially parallel to the length of the truck 102. A support assembly 110 is coupled to the bed extender 100 at a distance away from the pickup truck 102.

The support assembly 110 includes a rear T-shaped support member 112 having a horizontally oriented rear support rail 114. As shown, the rear support rail 114 is positioned perpendicular to the extending rail 106 and is raised to a height that is substantially level with the truck bed 104. The rear support rail 114 is attached at a central point to a vertically oriented rear upright rail 116 at a first end. The rear support rail 114 and the rear upright rail 116 may be welded together, or securely joined by other known methods. A second end of the rear upright rail 116 is securely coupled in the same manner to the extending rail 106.

The support assembly 110 also includes a front T-shaped support member 118 secured to the extending rail 106. The front T-shaped support member 118 contains a horizontally oriented front support rail 120 attached to a vertically oriented front upright rail 122. Like the rear support rail 114, the front support rail 120 is also positioned perpendicular to the extending rail 106 and raised to height that is substantially level with the truck bed 104.

The rear and front T-shaped support members 112 and 118 are spaced away from each other, with the front T-shaped support member 118 positioned closer to the pickup truck 102 than the rear T-shaped support member 112. Preferably, the lengths of the rear and front support rails 114 and 120 are equal to the effective cargo width of the truck bed 104. A pair of guide walls 124 are attached to the sides of the rear and front support rails 112 and 120 to help position and stabilize loads.

One or more ramps 128, which could be extendable or collapsible, are pivotally and slideably attached to the support assembly 110, preferably on the cross member of the rear T-shaped support member 112. Each extendable ramp 128 includes a bottom section 132 and a top section 134 coupled at a ramp hinge 130. The top and bottom sections 134 and 132 respectively, may also be collapsibly coupled in any other manner, such as telescopically. When fully expanded (as shown in FIG. 1), the ramps 128 extend from the ground to the rear T-shaped support member 112, with the top sections 134 proximate the rear T-shaped support member 112 and the bottom sections 132 contacting the ground.

Figure 2:
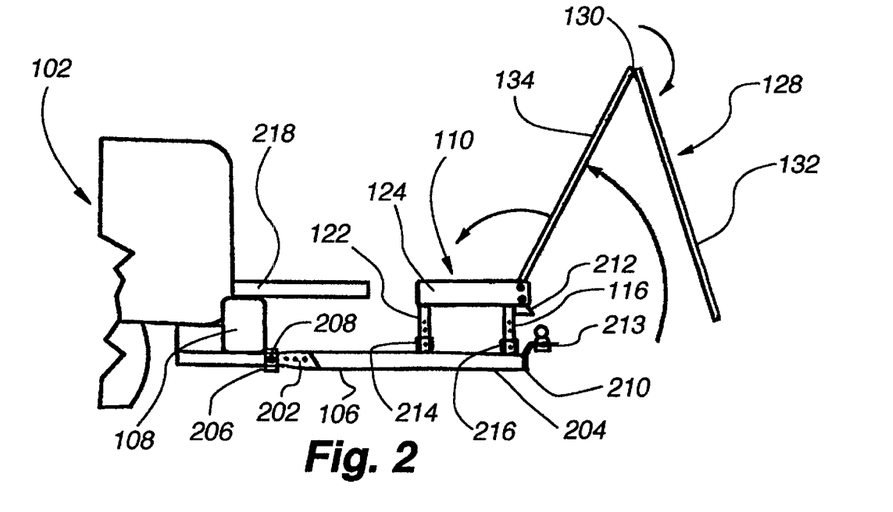
FIG. 2 shows a side view of the bed extender attached to the pickup truck with the loading ramps in transition from a fully extended position to a fully retracted position, in accordance with one embodiment of the present invention.

In FIG. 2, a side view of the bed extender 100 attached to the pickup truck 102 is shown. The extending rail 106 includes a truck end 202 and a free end 204. The truck end 202 engages a truck hitch receiver 206 located below the truck bumper 108. The horizontal position of the bed extender 100 may be adjusted by sliding the extending rail 106 forward or backward within the truck hitch receiver 206 in a telescoping fashion. A hitch pin 208 is inserted through holes on the truck hitch receiver 206 and holes along the truck end 202 of the extending rail 106 to lock the horizontal position of the extending rail 106 into place. Other known securing methods, such as latches and jam bolts, similar to those discussed with respect to the front and rear support rails 122 and 166 above, may be used to secure the extending rail 106 inside the truck hitch receiver 206.

Preferably, the truck hitch receiver 206 and the truck end 202 of the extending rail 106 have a rectangular cross-sectional profile for easy alignment of the bed extender 100. Other cross-sectional profiles for the truck hitch receiver 206 and the truck end 202, such as circular and triangular, may also be used, and are considered within the scope of the present invention.

The extending rail 106 includes a bottom hitch receiver 210 proximate the free end 204. A top hitch receiver 212 is located above the bottom hitch receiver 210 on the rear T-shaped support member 112. The bottom and top hitch receivers 210 and 212 are configured to link with a conventional hitch post 213 and other devices which are normally inserted in a truck hitch receiver.

In one embodiment of the invention, a front sleeve 214 and a rear sleeve 216 are mounted proximate the free end 204 of the extending rail 106. The front and rear sleeves 214 and 216 are aligned to receive the front and rear upright rails 122 and 116, respectively of the front and rear T-shaped support members 118 and 112 respectively, and allow for vertical adjustment of the support assembly 110. Specifically, the support assembly 110 is raised and lowered in a telescoping fashion by sliding the front and rear upright rails 122 and 116 up and down within the front and rear sleeves 214 and 216. Locking pins (not shown) are inserted through holes in the front and rear sleeves 214 and 216, and through aligned holes along the lengths of the front and rear upright rails 122 and 116, thereby securing the vertical position of the support assembly 110. In this manner, the support assembly 110 can be vertically aligned with a lowered truck tailgate 218.

Other known securing devices, such as jam bolts, can also be used to secure the support members 112 and 118 to the front and rear sleeves 214 and 216. The jam bolts are threaded on one end and extend through a threaded portion on the front and rear sleeves 214 and 216. The jam bolts have a generally flat surface which abuts the front and rear upright rails 122 and 116 when screwed through the threaded portion of the front and rear sleeves 214 and 216, thereby holding the rails 122 and 116 in the desired position within the front and rear sleeves 214 and 216.

FIG. 2 also shows the extendable ramps 128 in transition from a fully extended position to a fully retracted position.

To retract the ramps 128, the bottom ramp sections 132 are pivoted at the ramp hinges 130 towards the top ramp sections 134 such that the ramp hinges 130 are lifted above the support assembly 110. Concurrently, the top ramp sections 134 are pivoted at the rear T-shaped support member 112 towards the pickup truck 102. This motion is continued until the ramps 128 are fully retracted.

Figure 3:
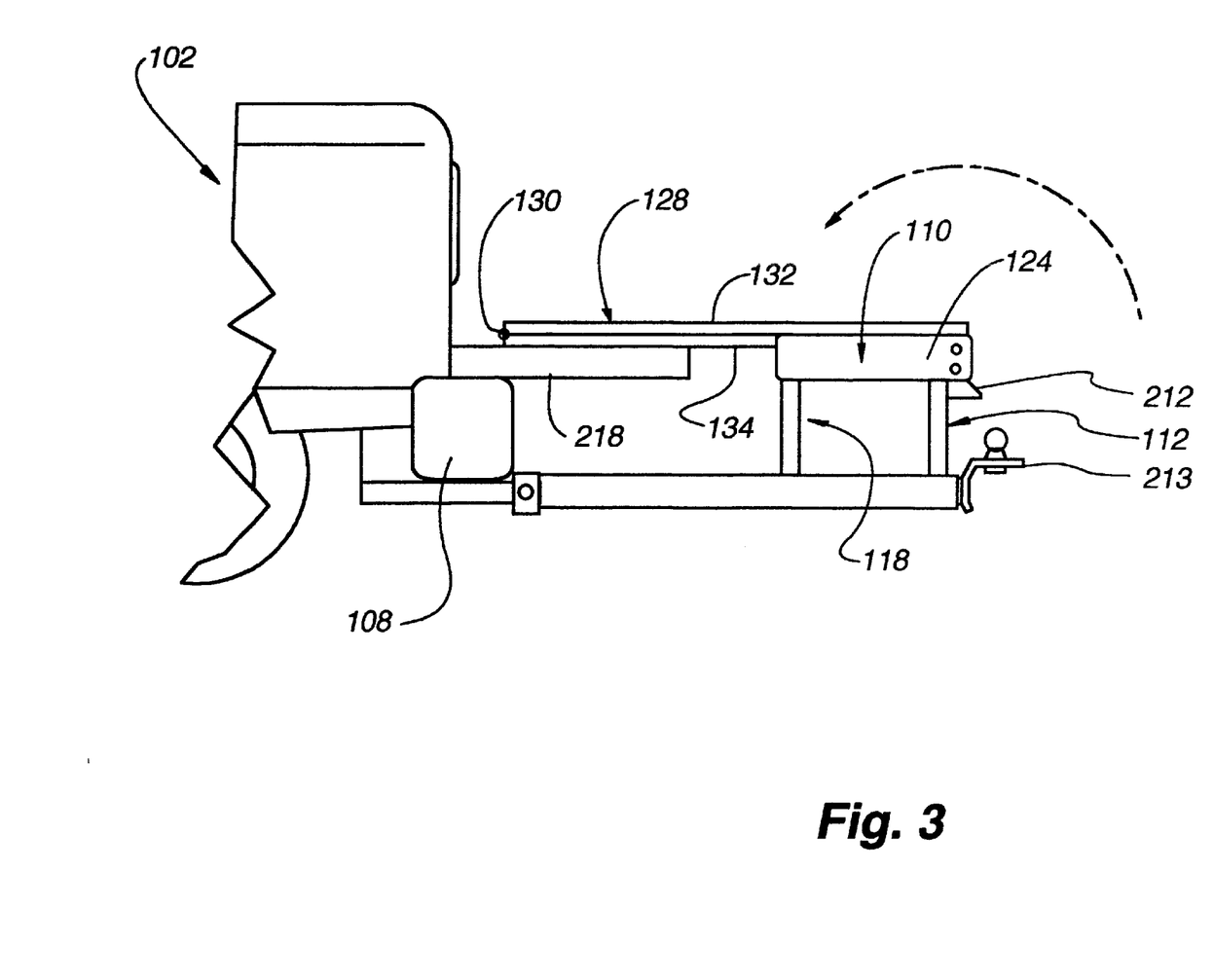
FIG. 3 shows a side view of the bed extender with the extendable ramps in a fully retracted position, in accordance with one embodiment of the present invention.

In FIG. 3, the bed extender 100 is shown with the extendable ramps 128 in the fully retracted position. In this position, the extendable ramps 128 are swung completely over the support assembly 110 to a horizontal position. The fully retracted ramps 128 are collapsed such that the bottom ramp sections 132 rest over the top ramp sections 134 of the ramps 128, with the ramp hinges 130 proximate the pickup truck 102.

When the ramps 128 are in the fully retracted position, they may perform different functions depending on whether the truck tailgate 218 is raised or lowered. If the tailgate 218 is raised when ramps 128 are fully retracted, the front and rear T-shaped support members 118 and 112 maintain the ramps 128 in a horizontal position, and the retracted ramps 128 provide a platform for additional storage separate from the truck bed 104.

If the tailgate 218 is lowered when the ramps 128 are in the fully retracted position, as shown in FIG. 3, the ramps provide a bridging platform between the support assembly 110 and the tailgate 218. In this configuration, the retracted ramps 128 are supported horizontally by tailgate 218, as well as by the T-shaped support members 118 and 112. Thus, when the tailgate 218 is lowered, the retracted ramps 128 extend the effective truck bed length to include the support assembly 110.

Figure 4:
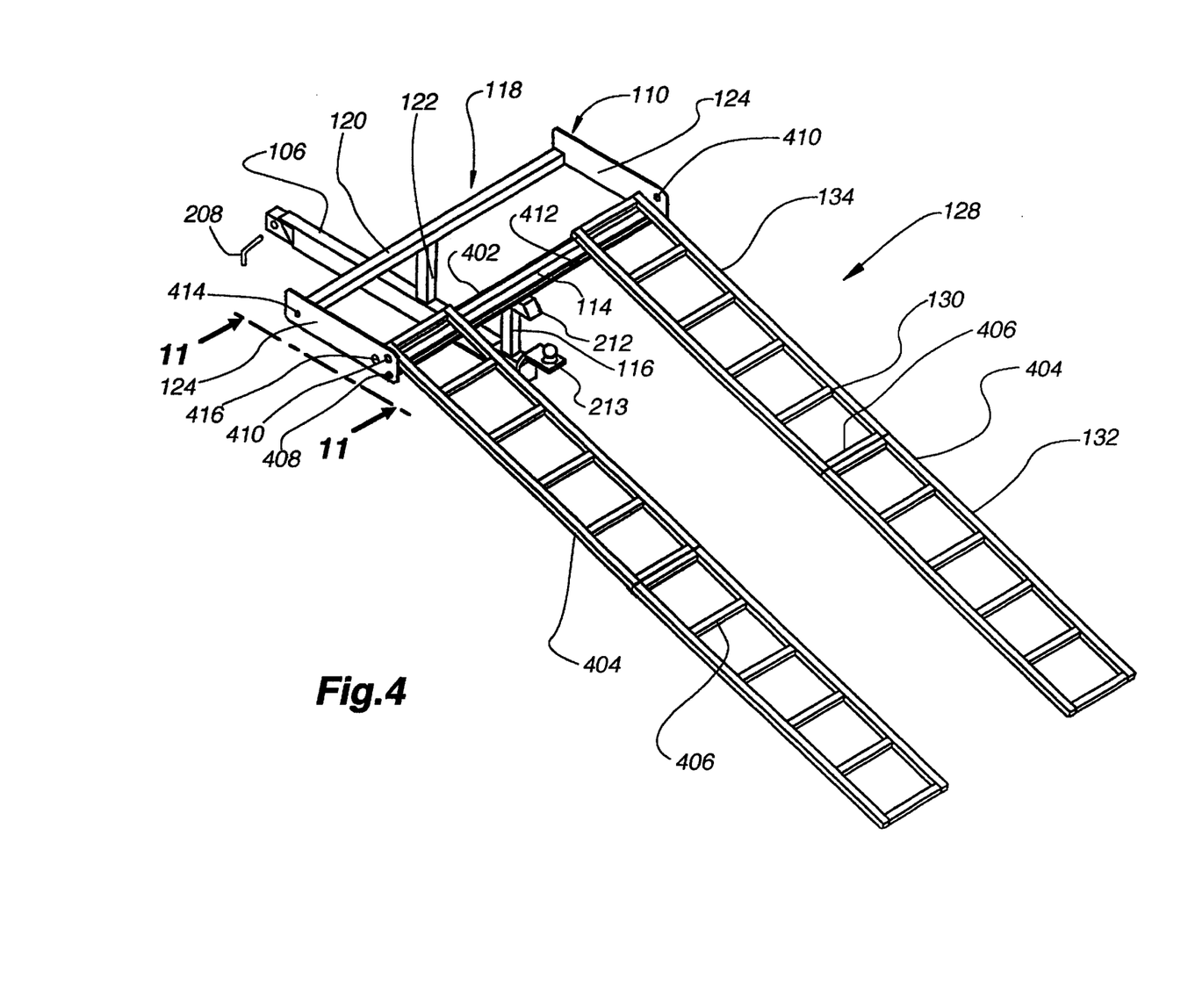
FIG. 4 shows another rear perspective view of a bed extender, in accordance with one embodiment of the present invention.

In FIG. 4, another perspective view of the bed extender 100 is shown. In one embodiment of the invention, a ramp bar 402 proximate the rear support rail 114 is attached at its ends to the guide walls 124. The ramp bar 402 secures the top sections 134 of the ramps 128 to the support assembly 110. Particularly, the ramp bar 402 is inserted into holes or rings (not shown) in the top ramp sections 134 which fit around the ramp bar 402. The ramp bar preferably has a diameter of %16". Thus, the extendable ramps 128 are able to pivot and slide along the ramp bar 402, as described in more detail below.

In an alternative embodiment, the extendable ramps 128 are coupled directly to the rear support rail 114. For example, the top ramp sections 134 include rings (not shown) which fit around the rear support rail 114. Such a configuration securely holds the ramps 128 onto the support assembly 110, while allowing the ramps 128 to pivot and slide along the rear support rail 114.

Each of the bottom and top ramp sections 132 and 134 is in the form of a ladder, having a pair of ramp rails 404 and a plurality of ramp rungs 406. Each ramp rung 406 extends perpendicularly between the pair of ramp rails 404. In a particular embodiment, the ramp rails 404 and the ramp rungs 406 have a rectangular cross-section, however, other cross-sectional geometries are also contemplated by the present invention.

When the ramps 128 are fully extended, the ramp rails 404 at the bottom ramp sections 132 abut the ramp rails 404 at the top ramp sections 134. This configuration prevents the ramps 128 from collapsing when a load is rolled over the ramps. Abutting ramp rungs 406 proximate the ramp hinges 130 may also be used to support the ramps 128 in the fully extended position.

As mentioned earlier, the support assembly 110 includes guide walls 124 attached to the sides of the front and rear support rails 120 and 114. Preferably, the guide walls 124 rise above the height of the front and rear support rails 120 and 114, thereby forming guide fences on both sides of the support assembly 110 to help load cargo onto the truck bed 104.

The guide walls 124 each include a bottom ramp locking hole 408 and a top ramp locking hole 410. The ramp locking holes 408 and 410 are aligned such that a ramp locking bar 412 can be inserted into either pair of locking holes 408 and 410. Preferably, the locking holes 408 and 410 are round and the locking bar 412 is cylindrical in shape. The locking bar 412 is used to secure the ramps 128 at an angle between and including substantially horizontal and substantially vertical. The function of the locking holes 408 and 410 and the locking bar 412 will become apparent when detailed further below.

Figure 14A:
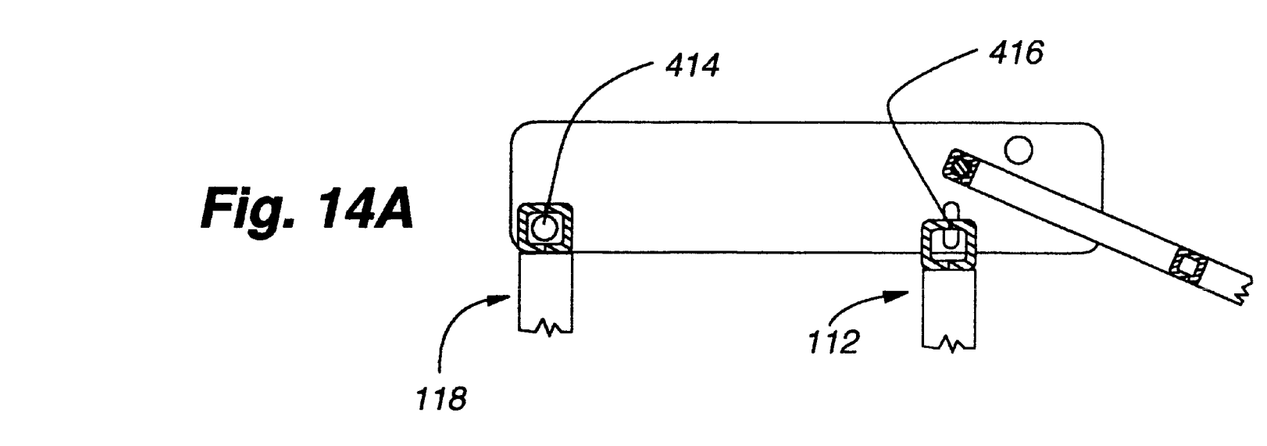
FIG. 14A is a cross-sectional view of the support assembly of FIG. 4 along section line 11—11 with extendable ramps locked at an inclined position showing the rear support member at a position relatively lower than the front support member through attachment of the rear support member to the guide walls at a lower point than the front support member in accordance with one embodiment of the present invention.

Additionally, the guide walls 124 include a front mounting hole 414 and a rear mounting hole 416 to mount the front and rear support members, 118 and 112, respectively. The rear mounting hole 416 is either a slot or a larger hole to allow the rear support member 112 to be mounted to the guide walls 124 at a relatively lower position than the front support member 118 as shown in FIG. 14A. This causes the rear support rail 114 to be in a position relatively lower than the front support rail 120. One such benefit of having the rear support rail 114 in a lower position than the front support rail 120 is that less force is required to move the ATV 502 over the rear support rail onto the support assembly 110. This also facilitates loading of an ATV 502 onto the truck bed 104.

Figure 14B:
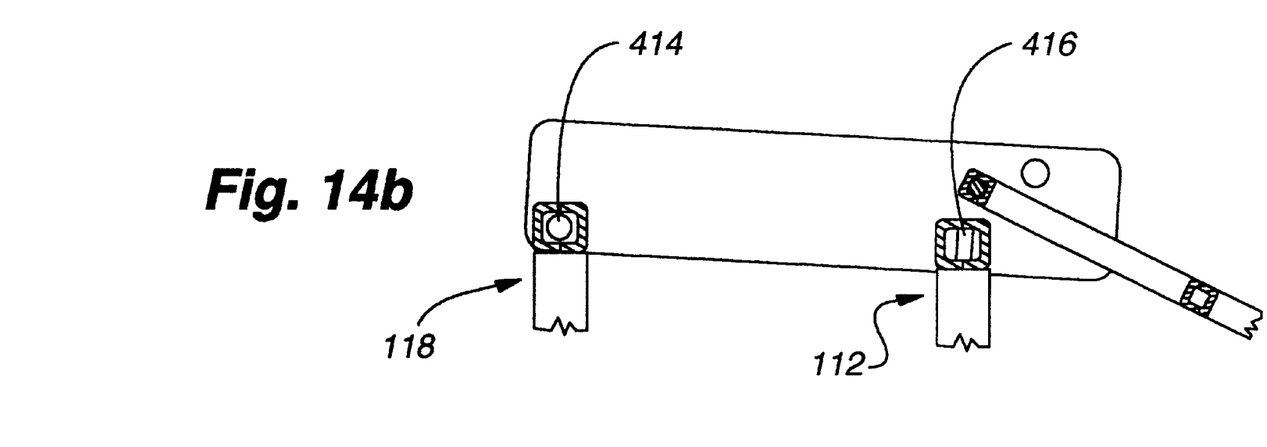
FIG. 14B is a cross sectional view of the support assembly of FIG. 4 along section line 11—11 with extendable ramps locked at an inclined position showing the rear support member at a position relatively lower than the front support member through an adjustment of the rear upright rail lower than the front upright rail, in accordance with one embodiment of the present invention.

The relatively lower positions of the rear support rail 114 with respect to the front support rail 120 can also be achieved by adjusting the rear upright rail 116 to a lower position than the front upright rail 122. This results in the entire support assembly 110 tilting in a relatively downward direction from front to rear as shown in FIG. 14B. This would require that the guide walls 124 are pivotally attached to, or are adjustable with respect to, the front and rear support members 118 and 112.

Figure 5:
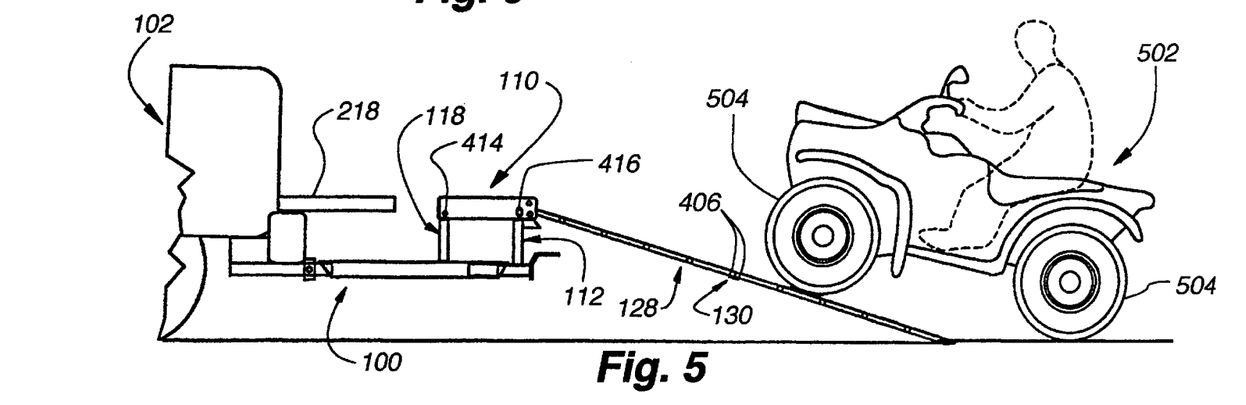
FIG. 5 shows a side view of an ATV being loaded onto a pickup truck using a bed extender in accordance with one embodiment of the present invention.

In FIG. 5, an ATV 502 is shown being loaded onto the pickup truck 102 using the bed extender 100 of the present invention. The ATV 502 is driven up the ramps 128, which are fully extended from the support assembly 110 to the ground. As discussed above, the extendable ramps 128 are coupled to the ramp bar 402 proximate the rear T-shaped support member 112. The ramps 128 are prevented from bending at the ramp hinges 130 by abutting ramp rails 404 and/or ramp rungs 406. Furthermore, the distance between the front and rear T-shaped support members 118 and 112, as well as the distance between the tailgate 218 and the front T-shaped support member 118, is small enough to allow the tires 504 of the ATV 502 to roll over the spaces without requiring additional support.

Figure 6:
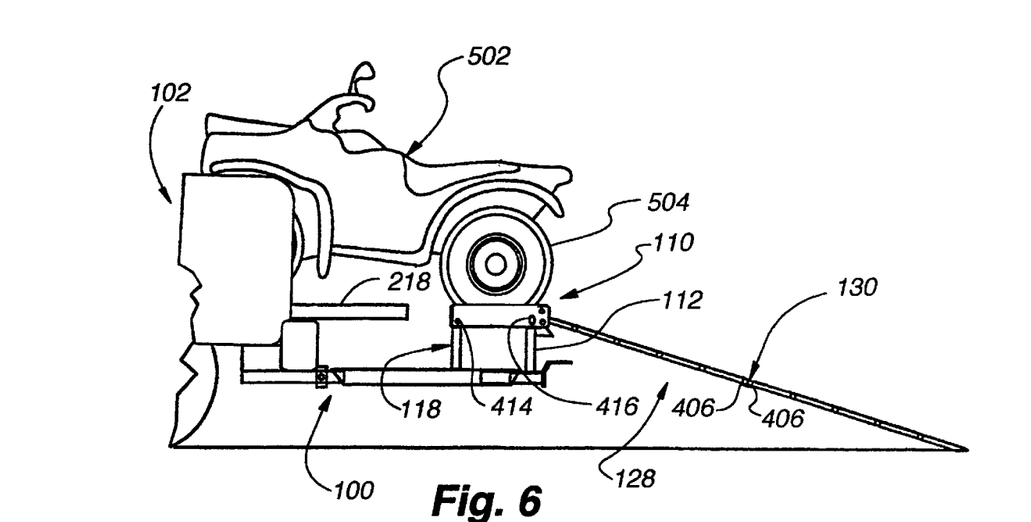
FIG. 6 shows a side view of an ATV loaded on the pickup truck and bed extender, in accordance with one embodiment of the present invention.

In FIG. 6, the ATV 502 is shown loaded on the pickup truck 102 and bed extender 100. As illustrated, the loaded ATV 502 is rested partially on the truck bed 104 and partially on the support assembly 110. The rear tires 504 of the ATV 502 rest in between the front and rear T-shaped support members 118 and 112.

Figure 7:
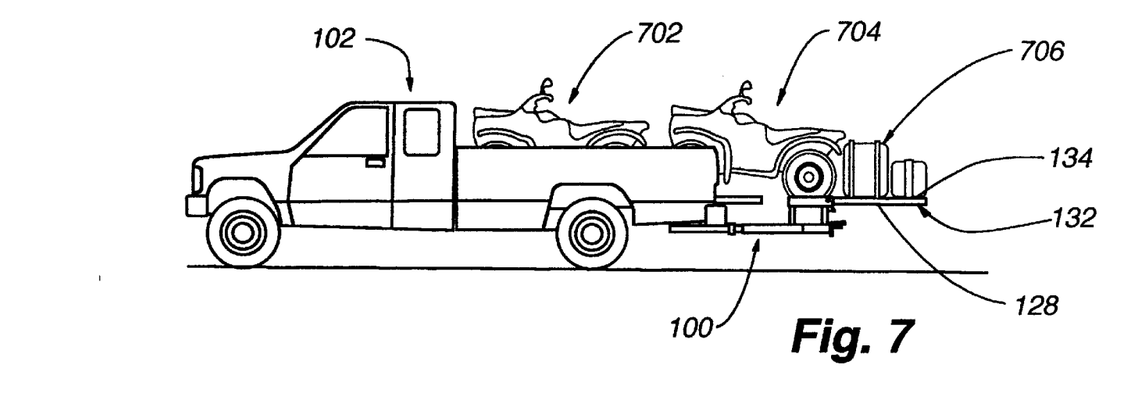
FIG. 7 shows a side view of a pickup truck and a bed extender loaded with two ATVs, with the extendable ramps in a partially extended and horizontal configuration, in accordance with one embodiment of the present invention.

In FIG. 7, the pickup truck 102 and bed extender 100 are shown loaded with a front and rear ATV 702 and 704. The front ATV 702 is carried entirely inside the truck bed 104, while the rear ATV 704 is positioned behind the front ATV 702, partially in the truck bed 104 and partially on the bed extender 100. Thus, the bed extender 100 allows users to transport two ATVs without necessitating a trailer.

Besides supporting the rear ATV 704, the bed extender 100 can receive extra cargo 706 when the ramps 128 are partially extended and locked in a horizontal position. In this ramp position, the bottom ramp sections 132 are folded under the top ramp sections 134. As described in detail below, the ramps 128 are held in the horizontal position by inserting the ramp locking bar 412 into the bottom ramp locking holes 408. Thus, the additional cargo 706 may be placed on the cantilevered horizontal platform formed by the extendable ramps 128.

Figure 8:
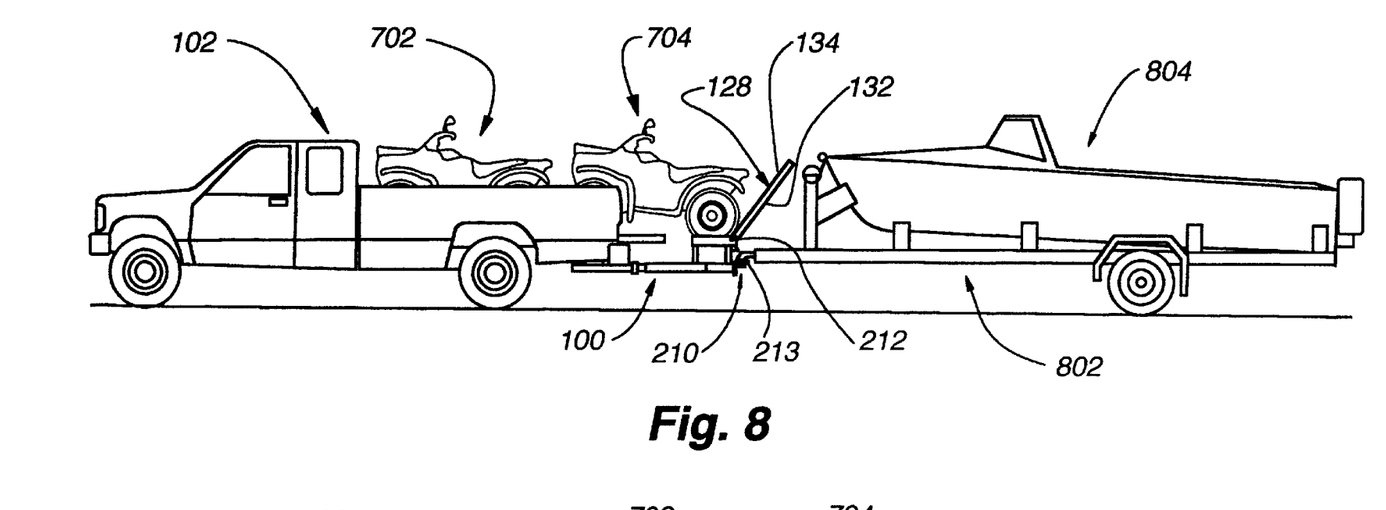
FIG. 8 shows a side view of a pickup truck and a bed extender loaded with two ATVs and additionally coupled to a boat trailer, in accordance with one embodiment of the present invention.

In FIG. 8, another exemplary configuration of the pickup truck 102 and the bed extender 100 is shown. In this configuration, the front and rear ATVs 702 and 704 are loaded one behind the other. The extendable ramps 128 are partially extended and positioned in an angled configuration. As described in detail below, the ramps 128 are held at the angled position by inserting the ramp locking bar 412 into the top ramp locking holes 410 and the bottom ramp sections 132 under the top ramp sections 134. When the ramps are arranged in the angled and partially extended position, the rear ATV 704 is prevented from rolling backwards off the bed extender 100.

FIG. 8 also illustrates a boat trailer 802 carrying a boat 804, and with the boat trailer 802 coupled to the bed extender 100. As mentioned above, the bed extender 100 includes a bottom hitch receiver 210 and a top hitch receiver 212. When fitted with an appropriate hitch post 213, the hitch receivers 210 and 212 enable the pickup truck to pull the trailer 802 behind the bed extender 100.

Figures 9, 10:
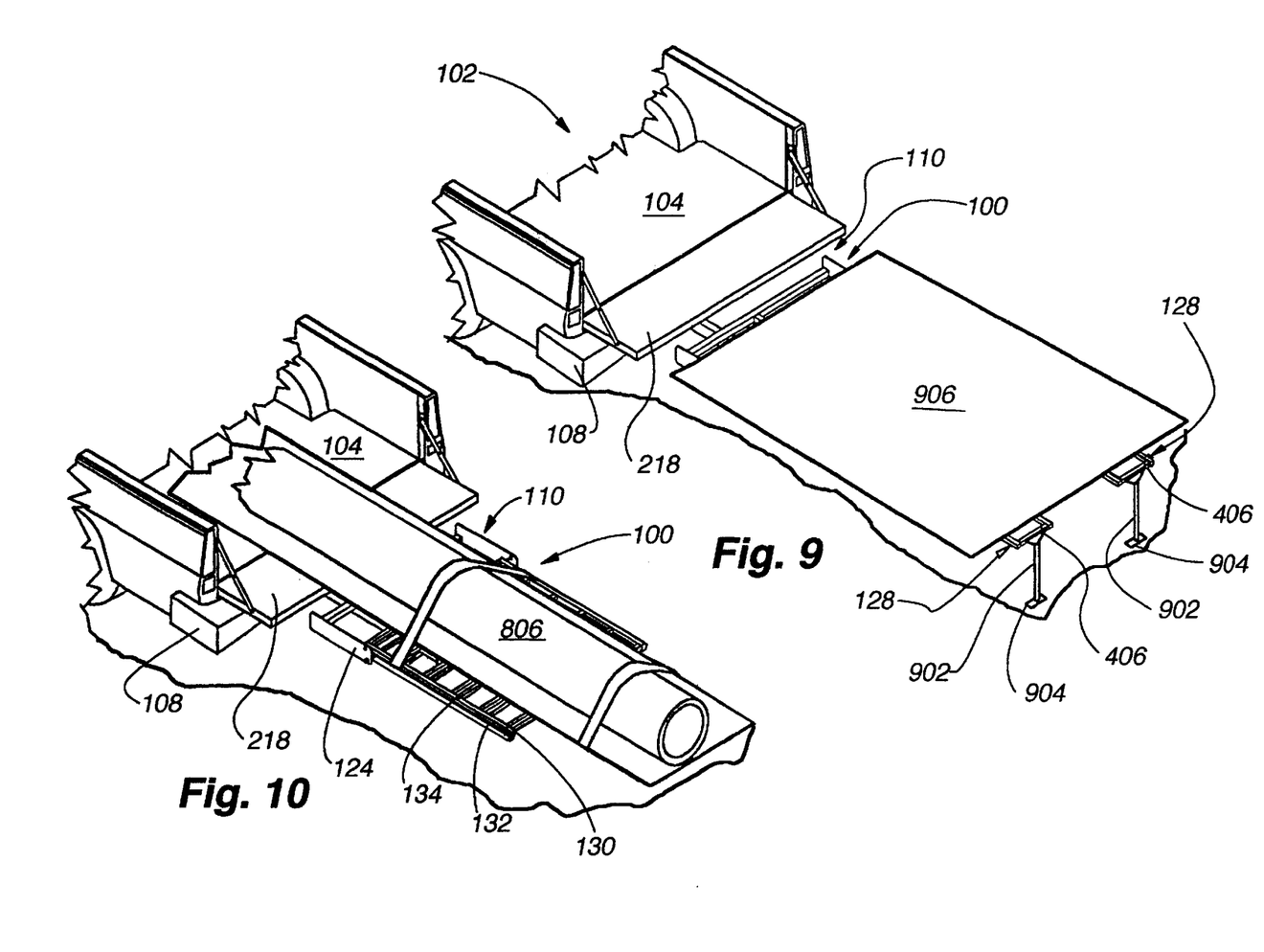
FIG. 9 shows a perspective view of a bed extender configured to form a portable worktable, picnic table, or the like, in accordance with one embodiment of the present invention.
FIG. 10 shows a perspective view of a bed extender configured to support lengthy cargo that would otherwise be too long to fit in a truck bed, in accordance with one embodiment of the present invention.

In FIG. 9, the bed extender 100 is configured to form a portable worktable, picnic table, or the like. In this embodiment, the bed extender 100 includes ramp legs 902 coupled to the ramps 128. Preferably, the ramp legs 902 are mounted to the ramp rungs 406 farthest from the truck 102 and raise the extendable ramps 128 to the height of the truck bed 104. Furthermore, it is contemplated that the ramp legs 902 can include telescoping members that allow the length of the ramp legs 902 to be adjusted.

In one embodiment of the invention, the ramp legs 902 are removed from the extendable ramps 128 when not in use. Alternatively, the ramp legs 902 may be configured to fold into the bottom ramp sections 132 when not in use. Each ramp leg 902 may also include a leg platform 904 to prevent the ramp legs 902 from sinking into soft ground. A flat board 906, such as a plywood board, may be placed over the fully extended ramps 128 to form a portable worktable or picnic table.

In FIG. 10, the bed extender 100 is shown configured to support lengthy cargo 806, such as a rolled carpet or long lumber, that would otherwise be too long to fit in the truck bed 104. In this configuration, the bed extender 100 is used to shift the pivot point of the cargo 806 from the lowered tailgate 218 to the end of the extendable ramps 128. Thus, the bed extender 100 braces long loads that would normally tip or fall out of the truck bed 104. The extendable ramps 128 are partially extended by the bottom ramp sections 132 underneath the top ramp sections 134, and then locking the ramps 128 in a horizontal position.

Figures 11, 12, 13, 14:
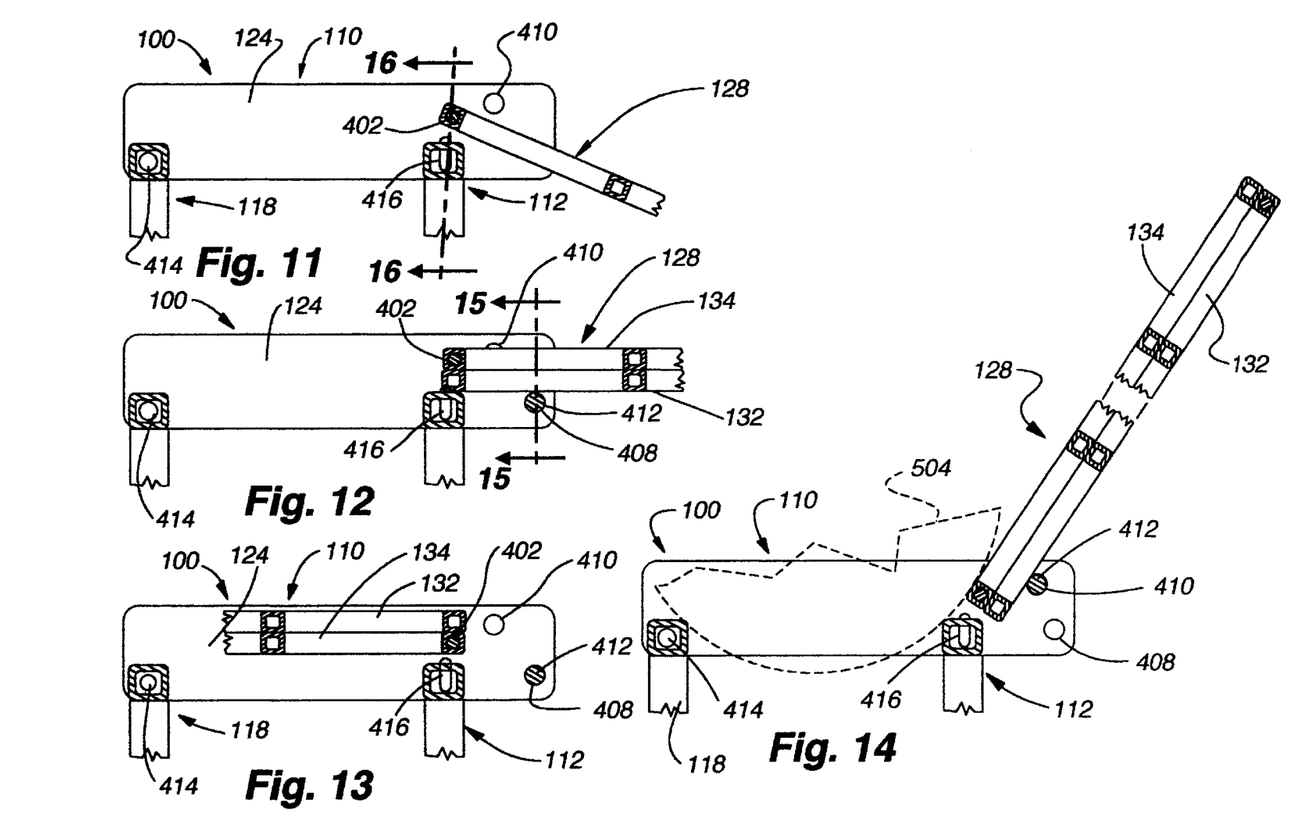
FIG. 11 is a cross-sectional view of the support assembly of FIG. 4 along section line 11—11 with the extendable ramps positioned in a fully extended position.
FIG. 12 is a cross-sectional view of the support assembly of FIG. 4 along section line 11—11 with the extendable ramps positioned in a substantially horizontal angle.
FIG. 13 is a cross-sectional view of the support assembly of FIG. 4 along section line 11—11 with the extendable ramps positioned in a fully retracted position.
FIG. 14 is a cross-sectional view of the support assembly of FIG. 4 along section line 11—11 with extendable ramps locked at an inclined position.

FIG. 11 is a cross-sectional view of FIG. 4 along section line 11—11. As shown, the extendable ramps 128 are coupled to the support assembly 110 proximate the rear T-shaped support member. The ramp bar 402 is inserted into the top ramp section 132, and is mounted in between the pair of guide walls 124. Thus, the extendable ramps 128 can slide back and forth along the ramp bar 402, as well as pivot about the ramp bar 402.

In FIG. 12, a cross-sectional view of the support assembly 110 is shown with the extendable ramps 128 positioned in a substantially horizontal angle. In this position, the ramps 128 are partially extended, with the bottom ramp sections 132 folded below the top ramp sections 134 (not shown). Moreover, the locking bar 412 is inserted though side walls 124 into the bottom locking holes 408. The bottom ramp sections 132 rest against a top section of the inserted locking bar 412, thereby bracing the ramps 128 in a substantially horizontal angle. As mentioned above, when the ramps 128 are partially extended and held in the horizontal position, the ramps can be used to support longer loads (see FIG. 10) or to transport additional cargo (see FIG. 7).

In FIG. 13, a cross-sectional view of the support assembly 110 is shown with the extendable ramps 128 positioned in the fully retracted position. In this configuration, the ramps 128 are turned towards the pickup truck 102, with the ramps 128 resting substantially horizontal on the front and rear T-shaped support members 118 and 112. Additionally, the bottom ramp sections 132 are situated over the top ramp sections 134.

In FIG. 14, a cross-sectional view of the support assembly 110 is shown with the extendable ramps 128 locked at an inclined angle. In this configuration, the ramps 128 block an ATV tire 504 from rolling off the support assembly 110 (see also FIG. 8). To lock the extendable ramps 128 at the inclined angle, the locking bar 412 is inserted through the guide walls 124 at the top locking holes 410. The ramps 128 are folded such that bottom ramp sections 132 are situated below the top ramp sections 134. The ramps 128 are braced at the inclined angle as the bottom ramp sections 132 rest against the locking bar 412.

Figure 15:
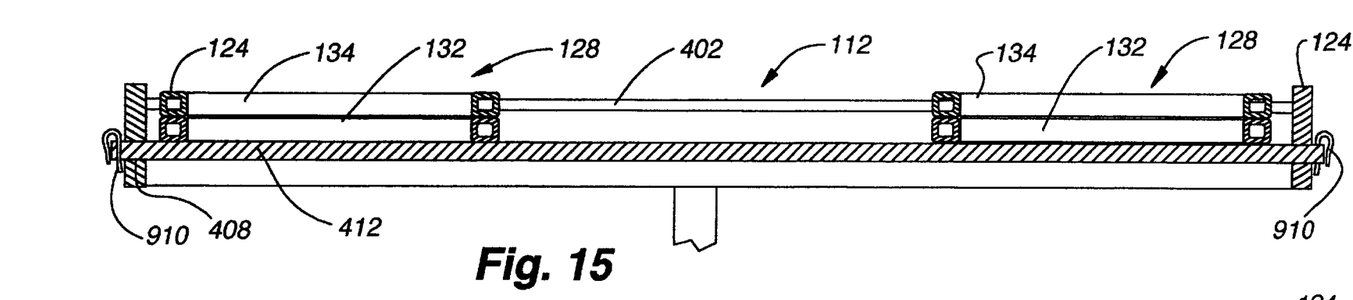
FIG. 15 is a cross-sectional view of FIG. 12 taken along section line 15—15.

FIG. 15 is a cross-sectional view of FIG. 12 along section line 15—15. As shown, the bottom ramp sections 134 are folded under the top ramp sections 132. The ramp bar 402 passes through the top ramp sections 134 and is attached at both ends to the guide walls 124. In addition, the extendable ramps 128 are propped horizontally by the locking bar 412. The locking bar 412 passes through the bottom locking holes 408 at the guide walls 124. To prevent the locking bar 412 from sliding out of the locking holes 408, a pair of spring loaded clips 910 are inserted at both ends of the locking bar 412.

Figure 16:
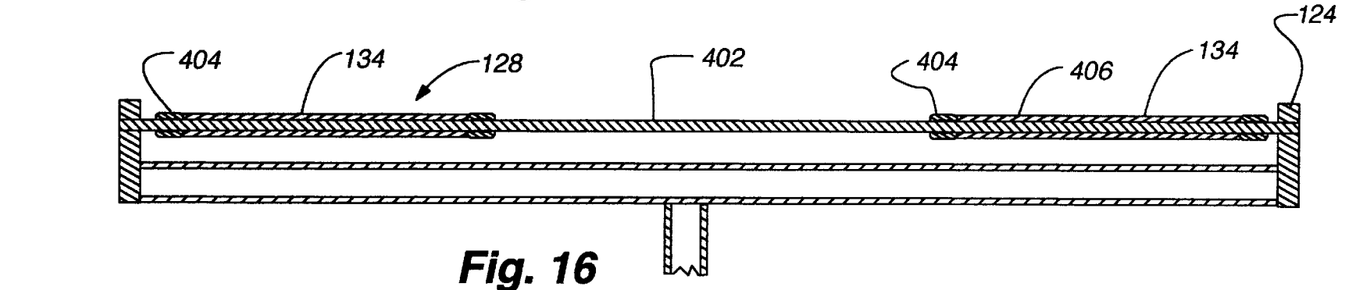
FIG. 16 is a cross-sectional view of FIG. 11 taken along section line 16—16.
Figure 17:
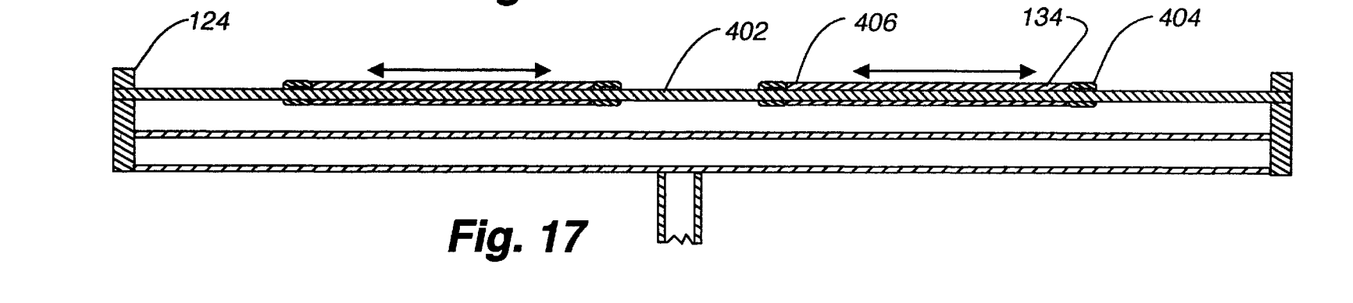
FIG. 17 is another cross-sectional view of the support assembly showing the ramps are able to slide along the ramp bar.

FIG. 16 is a cross-sectional view of FIG. 11 along section line 16—16. As shown, the ramp bar 402 passes through the top ramp sections 134 and is attached at both ends to the guide members 124. Preferably, the ramp bar 402 is received through holes within the ramp rails 404 and the ramp rungs 406 at the top ramp sections 134. In addition, the ramps 128 are able to slide along the ramp bar 402, as shown FIG. 17. Thus, the distance between the ramps 128 can be adjusted to match the tire placement of the vehicle to be loaded onto the ramps 128.

FIGS. 18A–18I show the components of one embodiment of the present invention. The support assembly 110 includes a lower support member 920 containing the front sleeve 214 and a rear sleeve 216. The front and rear sleeves 214 and 216 receive the front and rear T-shaped support members 118 and 112, as earlier described. Height adjustment of the support assembly 110 is achieved by sliding the front and rear support members 118 and 112 up or down within the front and rear sleeves 214 and 216 in a telescoping manner. Locking pins 922 are inserted into aligned holes 924 on the front and rear support members 118 and 112, as well as the front and rear sleeves 214 and 216, to lock the support assembly 110 at the desired height. As described above, jam bolts may also be used to adjust the height of the support assembly. The use of the jam bolts provides for a sturdier connection between the front and rear support members and the front and rear sleeves.

All adjustable components of the bed extender 100 are connected with a latch pin/hole connection, jam bolts, or the like. The front and rear support rails are preferably smaller in outer diameter than the inner diameter of the front and rear sleeves 214 and 216, such that the front and rear support rails fit within the front and rear sleeves. This may be reversed such that the front and rear support rails fit over the outside of the front and rear sleeves.

The lower support member 920 couples to the extending rail 106 at one end, and the other end of the lower support member 920 includes a lower hitch receiver 220. The extending rail 106 is locked into position by inserting a locking pin 922 within aligned holes 924 along the extending rail 106 and the lower support member 920. In this manner, adjustments to the distance between the support assembly 110 and the truck are achieved. It is also contemplated that the extending rail 106 can be bent at an angle proximate the truck end 202.

Figures 18A, 18B, 18C, 18D, 18E, 18F, 18G, 18H, 18I:
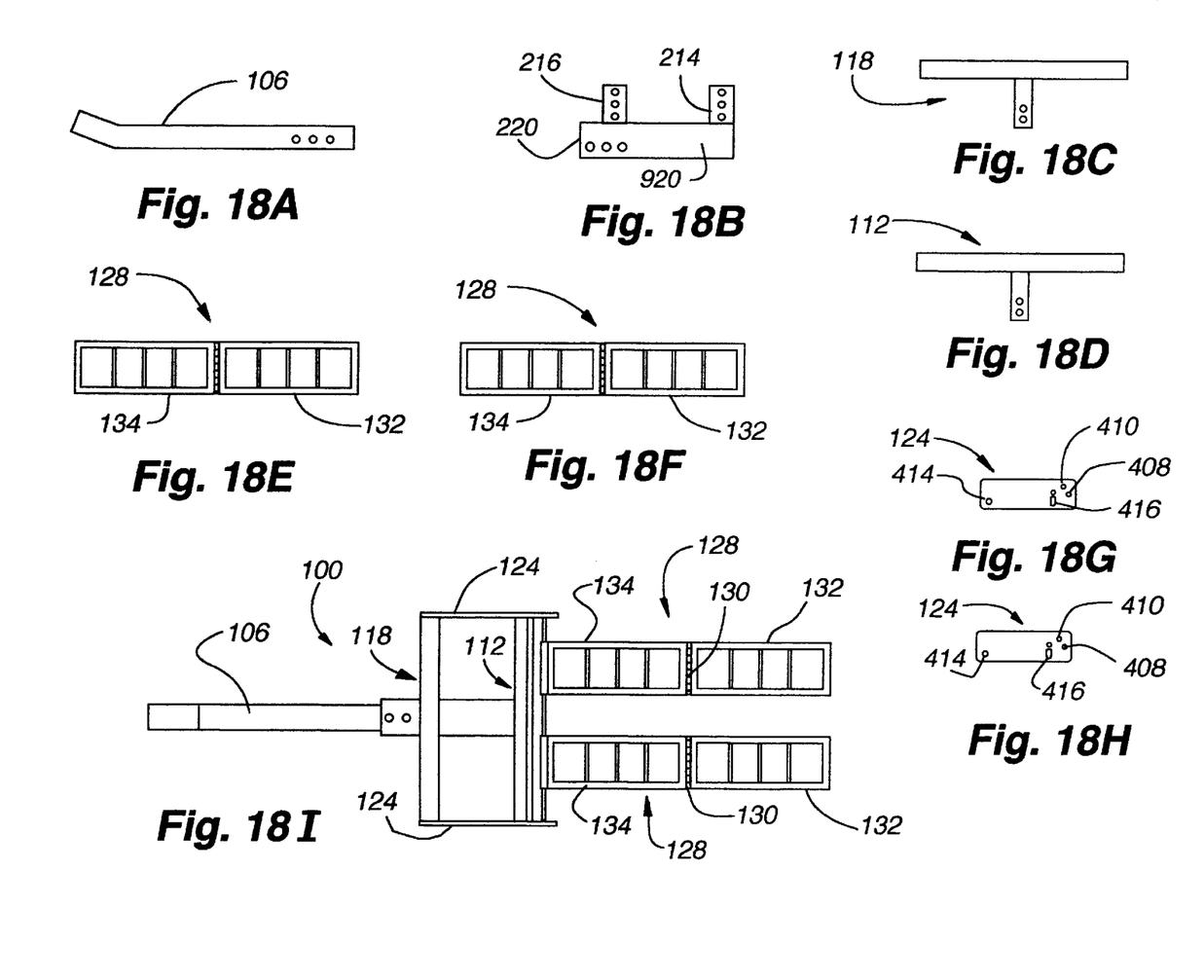
FIGS. 18A–18I show the individual components and a top view of an assembled unit of a bed extender, in accordance with one embodiment of the present invention.
Figure 19:
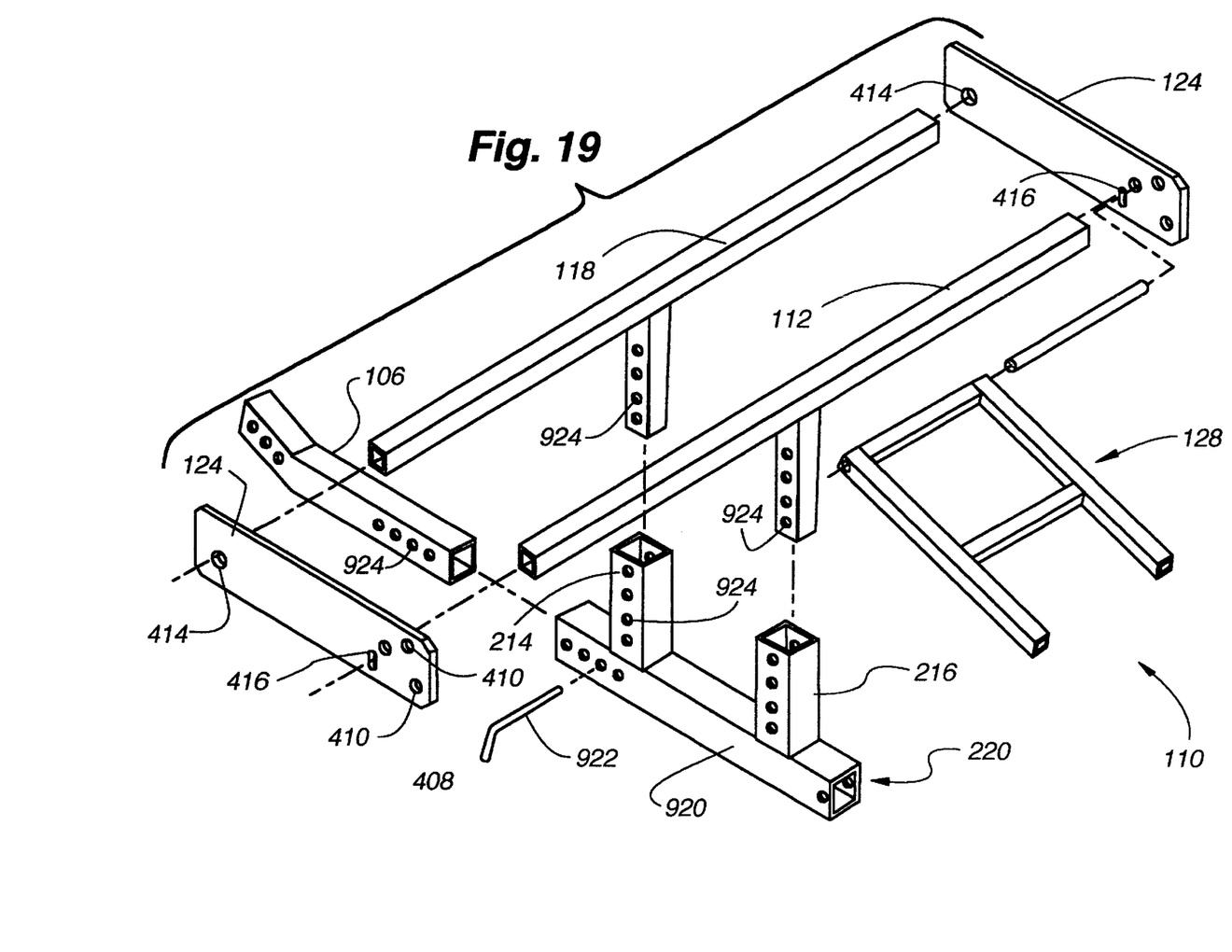
FIG. 19 is an exploded view showing the pieces and the orientation prior to assembly of a bed extender, in accordance with one embodiment of the present invention.

The guide walls 124 (See FIGS. 18G and 18H) are separable from the front and rear support members 118 and 112 (See FIGS. 18C and 18D). Each guide wall 124 is adjustably connected to the front and rear support members 118 and 112 through the front and rear mounting holes 414 and 416 as shown in FIGS. 14A and 14B. Jam bolts, or any other suitable fasteners, connect the guide walls and support members together to form the support assembly 110.

The components of the bed extender 100 are generally separable as shown is FIGS. 18A–18I and 19. The separable nature of the bed extender 100 facilitates manufacture, shipping and storage of the bed extender 100. This also allows for replacement of a particular component of the bed extender 100 without the need to replace the entire bed extender 100.

As described above, the bed extender 100 of the present invention allows for the easy and safe transport of two ATVs in a truck bed. The bed extender can also be used to support long cargo that would otherwise not fit in a truck bed. The bed extender ramps 128 can be configured to prevent an ATV from rolling off the truck bed, provide extra cargo room, or support a work surface. In addition, the bed extender is designed to receive at least one trailer hitch.

Although the invention has been described and illustrated with a certain degree of particularity, it is understood that the present disclosure has been made only by way of example, and that numerous changes, combinations and arrangements of techniques can be resorted to by those skilled in the art without departing from the spirit and scope of the invention, as hereinafter claimed.

What is claimed is:

1. A method of loading a vehicle having wheels onto a pickup truck, the method comprising:

moving said vehicle along a ramp onto said pickup truck, said ramp including a bottom ramp section pivotally connected to a top ramp section;

resting said vehicle at a position where at least one of said wheels is proximate a rear T-shaped member, said T-shaped member cantilevered to said pickup truck;

said ramp such that said bottom ramp section is tucked under said top ramp section;

pivoting said ramp at said rear T-shaped member to an angle; and locking said ramp at said angle.

2. The method of claim 1, wherein said locking operation further includes locking said ramp at said angle such that the vehicle does not roll off said pickup truck.

* * * * *